United States Patent
Suzuki et al.

(10) Patent No.: US 11,226,401 B2
(45) Date of Patent: Jan. 18, 2022

(54) OPTICAL DISTANCE MEASURING APPARATUS

(71) Applicant: DENSO CORPORATION, Kariya (JP)

(72) Inventors: Shunpei Suzuki, Kariya (JP); Kunihiko Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 782 days.

(21) Appl. No.: 16/071,330

(22) PCT Filed: Dec. 26, 2016

(86) PCT No.: PCT/JP2016/088606
§ 371 (c)(1),
(2) Date: Jul. 19, 2018

(87) PCT Pub. No.: WO2017/126294
PCT Pub. Date: Jul. 27, 2017

(65) Prior Publication Data
US 2019/0293762 A1 Sep. 26, 2019

(30) Foreign Application Priority Data

Jan. 22, 2016 (JP) .............................. JP2016-011109
Nov. 14, 2016 (JP) .............................. JP2016-221886

(51) Int. Cl.
*G01S 7/481* (2006.01)
*G01S 17/08* (2006.01)
*G01S 17/931* (2020.01)

(52) U.S. Cl.
CPC ........... *G01S 7/4812* (2013.01); *G01S 7/4811* (2013.01); *G01S 7/4813* (2013.01); *G01S 17/08* (2013.01); *G01S 17/931* (2020.01)

(58) Field of Classification Search
None
See application file for complete search history.

(56) References Cited

U.S. PATENT DOCUMENTS 4,682,024 A * 7/1987 Halldorsson ............ G01S 3/782
250/225
6,087,975 A 7/2000 Sugimoto et al.
(Continued)

FOREIGN PATENT DOCUMENTS

JP H06-242224 A 9/1994
JP 08114446 A * 5/1996
(Continued)

*Primary Examiner* — Yuqing Xiao
*Assistant Examiner* — Amir J Askarian
(74) *Attorney, Agent, or Firm* — Maschoff Brennan

(57) ABSTRACT

An optical distance measuring apparatus is provided. The optical distance measuring apparatus includes a housing and multiple light projection and light reception portions. The housing includes an opening face. The multiple light projection and light reception portions emit light, and receive the light after the light is reflected. The multiple light projection and light reception portions are accommodated in the housing. The light is provided by laser light. By combining optical paths of the multiple light projection and light reception portions, a view angle of the optical distance measuring apparatus is widened compared with a view angle of one of the multiple light projection and light reception portions. The optical paths of the multiple light projection and light reception portions overlap with one another in the opening face when seen from a direction perpendicular to a direction along which the view angle of the optical distance measuring apparatus is widened.

11 Claims, 12 Drawing Sheets

(56) References Cited

U.S. PATENT DOCUMENTS

| | | | |
|---|---|---|---|
| 2003/0016348 A1* | 1/2003 | Sallee | F41G 7/2293 |
| | | | 356/141.1 |
| 2004/0001019 A1* | 1/2004 | Nakazawa | G01S 13/87 |
| | | | 342/70 |
| 2011/0248152 A1* | 10/2011 | Svajda | G01S 3/7835 |
| | | | 250/221 |
| 2014/0071428 A1 | 3/2014 | Suzuki et al. | |
| 2015/0185313 A1* | 7/2015 | Zhu | G01S 7/4817 |
| | | | 356/5.01 |
| 2015/0253124 A1* | 9/2015 | Steffey | G01B 11/002 |
| | | | 356/614 |
| 2016/0188936 A1* | 6/2016 | Nunnink | G02B 17/06 |
| | | | 235/462.22 |
| 2016/0306043 A1* | 10/2016 | Moss | G01S 17/42 |
| 2018/0100929 A1* | 4/2018 | O'Keeffe | G01S 17/10 |

FOREIGN PATENT DOCUMENTS

| | | |
|---|---|---|
| JP | H08-114446 A | 5/1996 |
| JP | H11-014747 A | 1/1999 |
| JP | 2003-329773 A | 11/2003 |
| JP | 2014-055860 A | 3/2014 |
| JP | 2014-115182 A | 6/2014 |

\* cited by examiner

OPTICAL DISTANCE MEASURING APPARATUS

CROSS REFERENCE TO RELATED APPLICATION

This application is based on Japanese Patent Application No. 2016-11109 filed on Jan. 22, 2016 and Japanese Patent Application No. 2016-221886 filed on Nov. 14, 2016, the disclosures of which are incorporated herein by reference.

TECHNICAL FIELD

The present disclosure relates to an optical distance measuring apparatus that detects a target in a wide angle range.

BACKGROUND ART

An optical distance measuring apparatus that is capable of detecting a target in a wide angle range may include a distance measuring apparatus described in Patent Literature 1. In the distance measuring apparatus disclosed in Patent Literature 1, multiple laser projection and laser reception portions are arranged in a radial manner along a virtual plane. This kind of distance measuring apparatus can detect the target in the wide angle range with a simpler configuration than a configuration in which an apparatus moves in a distance measuring area using a rotation mirror.

PRIOR ART LITERATURE

Patent Literature

Patent Literature 1: JP 2014-55860 A

SUMMARY OF INVENTION

In a distance measuring apparatus according to Patent Literature 1, in order to detect a target in a wide angle range, each of laser projection and laser reception portions are arranged so that optical paths of the respective laser projection and laser reception portions do not overlap with one another.

In order that laser light passes through a housing, an opening needs to be defined on the housing through which the optical paths of the respective laser projection and laser reception portions pass. In the apparatus of Patent Literature 1, the optical paths of the respective laser projection and laser reception portions are arranged not to overlap with one another. In this configuration, there is difficulty that the opening needs to be large. Particularly, in the apparatus of Patent Literature 1, the multiple optical paths are arranged in a horizontal direction not to overlap with one another, thus a length of the opening in the horizontal direction needs to be wide.

The optical distance measuring apparatus may be attached to an object, such as a vehicle, which executes a process using the optical distance measuring apparatus. In this case, a light transmissive cover larger than the opening needs to be attached to the object. Even when the light transmissive cover is not attached to the object and the opening is exposed, a through hole needs to be defined on the object to which the optical distance measuring apparatus is attached.

Particularly, the opening is large means that a length in a width direction of the opening is wide, a length in a height direction of the opening is wide, or the lengths in both of the width direction and the height direction are wide. Thus, the opening is small means that the length in the width direction of the opening is narrow, the length in the height direction of the opening is narrow, or the lengths in both of the width direction and the height direction are narrow. The width direction is set to an arbitrary linear direction, such as a horizontal direction. The height direction is perpendicular to the width direction. When the width direction is set to the horizontal direction, the height direction is set to a vertical direction.

When the opening in the horizontal direction is wide, the cover for the object to which the optical distance measuring apparatus is attached needs to be wide in the horizontal direction. When the opening in the vertical direction is wide, the cover for the object to which the optical distance measuring apparatus is attached needs to be wide in the vertical direction. When the opening in both of the horizontal direction and the vertical direction are wide, the cover for the object to which the optical distance measuring apparatus is attached needs to be wide in both of the horizontal direction and the vertical direction.

In order to detect the target in the wide angle range, the laser light may be emitted and received in the wide angle range. In this case, the laser light may enter the light transmissive cover that covers the opening of the optical distance measuring apparatus at a shallow angle.

When the laser light enters the light transmissive cover at the shallow angle, a big Fresnel reflection may occur. Typically, the cover is coated with an AR coat so as to restrict the Fresnel reflection, but the AR coat has difficulty in a heat resistance. When the optical distance measuring apparatus is employed in a temperature exceeding the heat resistance of the AR coat and the AR coat does not work, the Fresnel reflection becomes difficult to be restricted.

In view of the foregoing difficulties, it is a first object of the present disclosure to provide an optical distance measuring apparatus that detects a target in a wide angle range with a simple configuration and has a small opening face. It is a second object of the present disclosure to provide an optical distance measuring apparatus that detects a target in a wide angle range with a simple configuration and restricts the Fresnel reflection at a high temperature.

According to a first aspect of the present disclosure, an optical distance measuring apparatus is provided. The optical distance measuring apparatus includes a housing and multiple light projection and light reception portions. The housing includes an opening face. The multiple light projection and light reception portions emit light and receive the light after the light is reflected. The multiple light projection and light reception portions are accommodated in the housing. The light is provided by laser light. By combining optical paths of the multiple light projection and light reception portions, a view angle of the optical distance measuring apparatus is widened compared with a view angle of one of the multiple light projection and light reception portions. The optical paths of the multiple light projection and light reception portions overlap with one another in the opening face when seen from a direction perpendicular to a direction along which the view angle of the optical distance measuring apparatus is widened.

The above-described optical distance measuring apparatus includes the multiple light projection and light reception portions. Thus, the optical distance measuring apparatus can detect a target in a wide angle range with a simple configuration. The view angle of the optical distance measuring apparatus is widened compared with the view angle of the one of the multiple light projection and light reception portions. The optical paths of the multiple light projection and light reception portions overlap with one another in the opening face when seen from the direction perpendicular to the direction along which the view angle of the optical distance measuring apparatus is widened. With this configuration, seen from the direction perpendicular to the direction along which the view angle of the optical distance measuring apparatus is widened, a size of the opening face can be smaller than a size of an opening face in a case where the optical paths of the multiple light projection and light reception portions do not overlap with one another.

According to a second aspect of the present disclosure, an optical distance measuring apparatus is provided. The optical distance measuring apparatus includes a housing, multiple light projection and light reception portions, and a light transmissive cover. The housing includes an opening face. The multiple light projection and light reception portions emit light, and receive the light after the light is reflected. The multiple light projection and light reception portions are accommodated in the housing. The light is provided by laser light. The light transmissive cover is attached to the opening face. An optical axis of each of the multiple light projection and light reception portions enters the light transmissive cover at an incident angle. At least one of the incident angles is smaller than an angle formed by the optical axis corresponding to the incident angle and the opening face. Each of the incident angles is equal to or smaller than the angle formed by the optical axis corresponding to the incident angle and the opening face.

The above-described optical distance measuring apparatus includes the multiple light projection and light reception portions. Thus, the optical distance measuring apparatus can detect a target in a wide angle range with a simple configuration. In the configuration, the incident angle at which the projection light enters the light transmittable cover is smaller than an incident angle in a case where the light transmittable cover has a plate shape and is attached to the opening face. Thus, a Fresnel reflection can be restricted compared with the case where the light transmittable cover has the plate shape and is attached to the opening face. The Fresnel reflection is restricted due to a shape of the light transmittable cover, so the Fresnel reflection can be restricted even at a high temperature.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

First Embodiment

Figure 1:
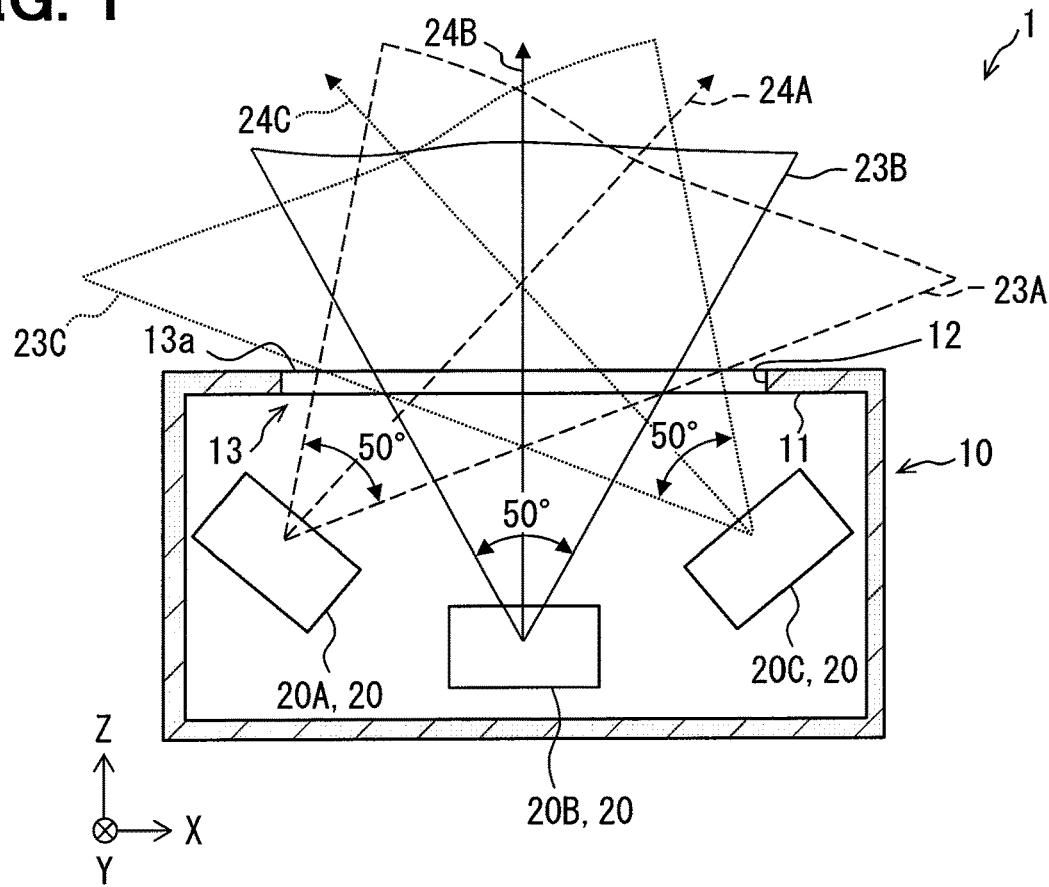
FIG. 1 is a diagram showing an optical distance measuring apparatus according to a first embodiment.

Hereinafter, embodiments will be described with reference to the drawings. An optical distance measuring apparatus 1 of a first embodiment may be attached to a vehicle. As shown in FIG. 1, a z-axis direction is in a lateral direction of the vehicle. The z-axis direction is perpendicular to a window 13. A y-axis direction is vertical to the vehicle. An x-axis direction is in a longitudinal direction of the vehicle.

As shown in FIG. 1, the optical distance measuring apparatus 1 includes three light projection and light reception units 20A, 20B, 20C in a housing 10. The housing 10 has a cuboid shape, and an opening face 12 is defined on a front wall 11 of the housing 10. The opening face 12 represents a face of opening that penetrates the housing 10. The front wall 11 of the housing 10 has a thickness. The opening face 12 in a thickness direction of the front wall 11 is arranged on an outer surface of the front wall 11, when the position is not mentioned. Alternatively, the opening face 12 in the thickness direction of the front wall 11 may be arranged within the thickness of the front wall 11. Even when the opening face 12 is arranged within the thickness of the front wall 11, the opening face 12 does not change in area. The window 13 covers the opening face 12. The window 13 is provided by a light transmissive member.

In the present embodiment, each of the light projection and light reception units 20A, 20B, 20C has the same configuration with one another. Thus, when there is no need to distinguish the three light projection and light reception units 20A, 20B, 20C, each of the light projection and light reception units 20A, 20B, 20C will be described as a light projection and light reception unit 20. The light projection and light reception unit 20 corresponds to a light projection and light reception portion.

The light projection and light reception unit 20 emits projection light, which is provided by laser light, and receives reflected light. The reflected light is generated by reflection of the projection light on an external target.

Figure 2:
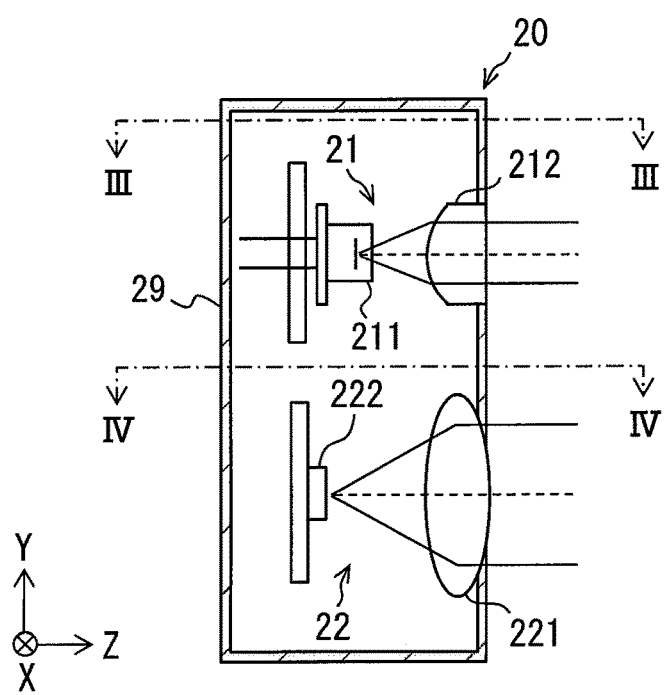
FIG. 2 is a diagram showing a configuration of a light projection and light reception unit shown in FIG. 1.

[Configuration of light projection and light reception unit 20] As shown in FIG. 2, the light projection and light reception unit 20 includes a light projection portion 21 and a light reception portion 22. A unit housing 29 houses the light projection portion 21 and the light reception portion 22. The light projection portion 21 and the light reception portion 22 are arranged in a vertical direction, and the direction is perpendicular to a traveling direction of the projection light.

The light projection portion 21 includes a light emitting element 211 and a light projection lens 212. The light emitting element 211 may be provided by a laser diode, and emits the projection light toward the light projection lens 212. The light reception portion 22 includes a light reception lens 221 and a light receiving element 222. The light reception lens 221 collects the reflected light and transfers the collected light to the light receiving element 222. The light receiving element 222 may be provided by a photo diode.

Figure 3:
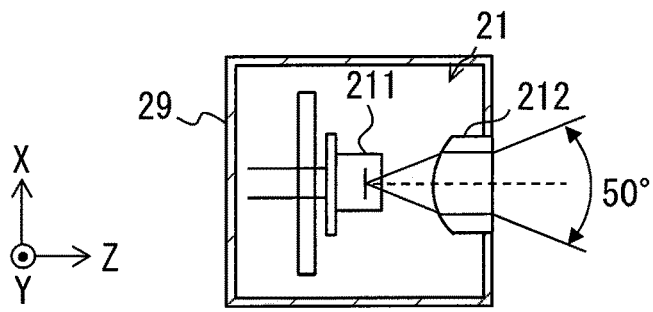
FIG. 3 is a cross-section view taken along a line of FIG. 2.

As shown in FIG. 3, the light projection lens 212 deflects the projection light emitted from the light emitting element 211 and outputs the deflected light in an angle range of 50 degrees with respect to the horizontal direction. The light projection lens 212 has a lens array structure.

Figure 4:
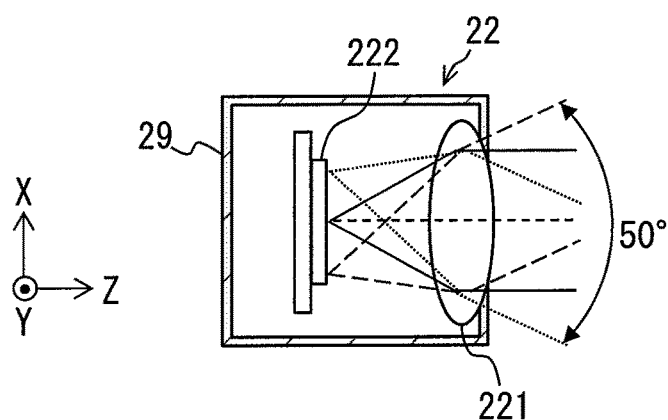
FIG. 4 is a cross-section view taken along a line Iv-Iv of FIG. 2.

The light projection portion 21 emits the projection light in the angle range of 50 degrees with respect to the horizontal direction. In addition, as shown in FIG. 4, the light receiving element 222 of the light reception portion 22 is adjusted in a size for having a view angle of 50 degrees with respect to the horizontal direction.

[Arrangement of Light Projection and Light Reception Unit 20]

Each of the light projection and light reception units 20A, 20B, 20C has the 50-degree view angle in the horizontal direction. Each of optical paths 23A, 23B, 23C through which the projection light and the reflected light pass sets the angle range within 50 degrees.

In order to arrange the three optical paths 23A, 23B, 23C in the same position in the vertical direction, the three light projection and light reception units 20A, 20B, 20C are arranged in the horizontal direction and arranged at the same height with one another. That is, an attitude of the optical distance measuring apparatus 1 is determined so that the three light projection and light reception units 20A, 20B, 20C are arranged in the horizontal direction.

As shown in FIG. 1, the three optical paths 23A, 23B, 23C pass through the opening face 12. The three optical paths 23A, 23B, 23C overlap with one another in the opening face 12. Specifically, the optical path 23A and the optical path 23C completely overlap on an outer surface 13a of the window 13. As described above, the window 13 covers the opening face 12. In the opening face 12, each of the optical path 23A and the optical path 23C includes the entire optical path 23B, and is wider than the optical path 23B. Optical axes 24A, 24B, 24C, which are respective center lines of the optical paths 23A, 23B, 23C intersect at one point.

Figure 5:
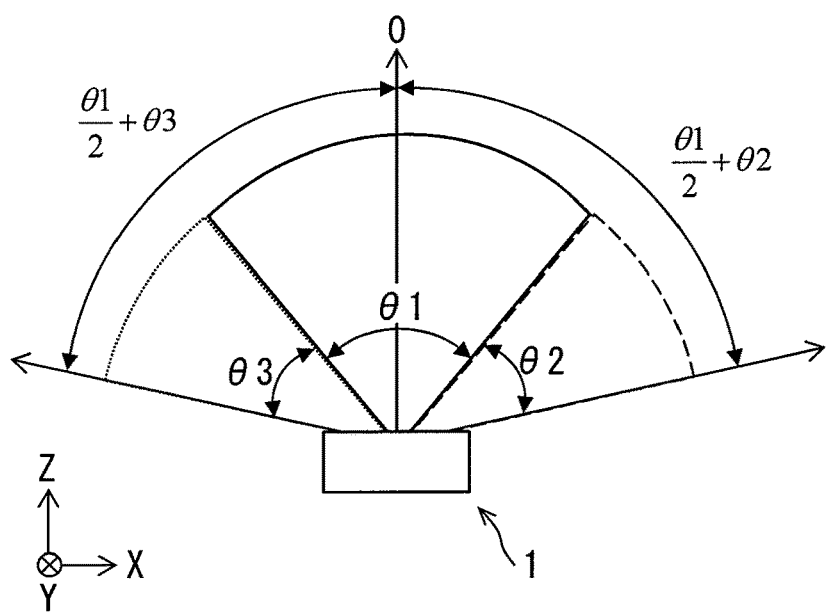
FIG. 5 is a diagram showing an entire view angle in a horizontal direction of the optical distance measuring apparatus according to the first embodiment.

When the light projection and light reception units 20A, 20B, 20C are arranged so that the respective optical axes 24A, 24B, 24C intersect with one another at the one point, as shown in FIG. 5, an entire view angle in the horizontal direction of the optical distance measuring apparatus 1 is defined as an angle θ1+θ2+θ3. An angle θ2 represents the view angle in the horizontal direction of the light projection and light reception unit 20A. An angle θ3 represents the view angle in the horizontal direction of the light projection and light reception unit 20C. An angle θ1 represents a view angle in the horizontal direction of the light projection and light reception unit 20B which does not overlap with the view angles in the horizontal direction of the light projection and light reception units 20A, 20C. A 0-degree direction is defined as a front direction of the optical distance measuring apparatus 1. The optical axis 24B of the light projection and light reception unit 20B is oriented to the 0-degree direction.

As shown in FIG. 5, the optical paths 23A, 23B, 23C of the respective light projection and light reception unit 20A, 20B, 20C are combined. With this configuration, the entire view angle in the horizontal direction of the optical distance measuring apparatus 1 is wider than the view angle in the horizontal direction of the one light projection and light reception unit 20.

On the other hand, as described above, the positions of the three optical paths 23A, 23B, 23C in the vertical direction are same with one another. With this configuration, the entire view angle in the vertical direction of the optical distance measuring apparatus 1 is same as the view angle in the vertical direction of each light projection and light reception unit 20A, 20B, 20C.

In the horizontal direction and the vertical direction, the direction in which the entire view angle of the optical distance measuring apparatus 1 becomes wider than the view angle of one of the light projection and light reception units 20A, 20B, 20C by combining the optical paths 23A, 23B, 23C is the horizontal direction. The vertical direction is perpendicular to the direction in which the entire view of the optical distance measuring apparatus 1 becomes wider than the view of one of the light projection and light reception units 20A, 20B, 20C.

Figure 6:
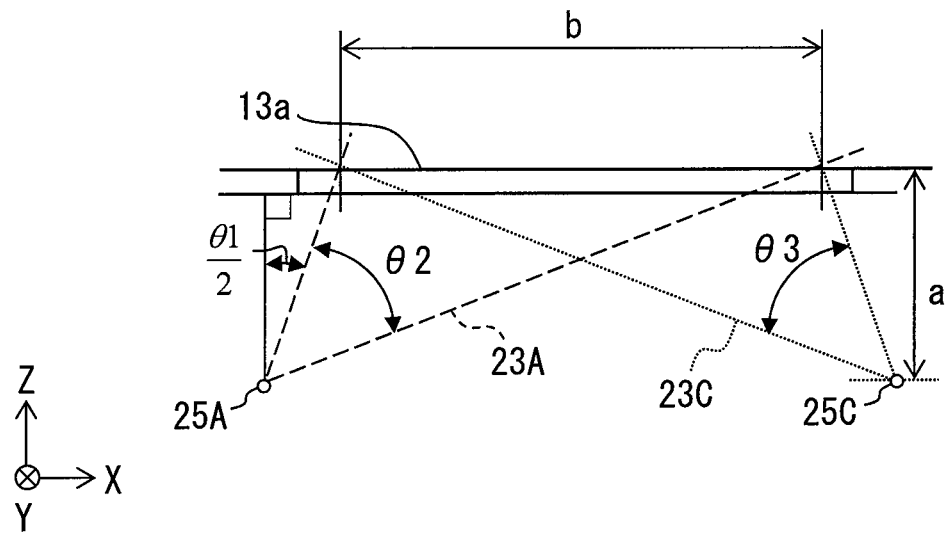
FIG. 6 is a diagram showing an enlarged view of a periphery area of the optical distance measuring apparatus shown in FIG. 5.

FIG. 6 shows an enlarged view of a periphery area of the optical distance measuring apparatus 1 shown in FIG. 5. As shown in FIG. 6, the optical paths 23A, 23C overlap on the outer surface 13a of the window 13. Assume that a distance from the outer surface 13a of the window 13 to each of virtual image emission points 25A, 25C is defined as a distance a. In this case, a minimum length b of the outer surface 13a of the window 13 in the horizontal direction may satisfy the following formula 1. The minimum length b is equal to a minimum size of the opening of the opening face 12 in the horizontal direction. A length of the opening face 12 in the horizontal direction may be equal to the minimum length b. In this case, the opening face 12 is a minimum opening face. As shown in FIG. 6, in the present embodiment, the length of the opening face 12 in the horizontal direction is longer than the minimum length b. Thus, the opening face 12 is wider than the minimum opening face. Each of the optical paths 23A, 23B, 23C is within the range of the minimum length b. That is, each of the optical paths 23A, 23B, 23C is within the minimum opening face.

In the above-described case, the angle θ2 represents the view angle of a specific light projection and light reception unit. The specific light projection and light reception unit is one of the light projection and light reception unit 20A, 20B, 20C. The specific light projection and light reception unit has the greatest length of an optical path in the opening face 12 along the horizontal direction among the optical paths 23A, 23B, 23C of the respective light projection and light reception unit 20A, 20B, 20C. When the angle θ3 is same as the angle θ2, in formula 1, a calculation result calculated using the angle θ3 is same as a calculation result calculated using the angle θ2. Thus, in this case, in formula 1, the angle θ2 is employed instead of the angle θ3. When the angle θ3 is greater than the angle θ2, the angle θ3 is employed instead of the angle θ2.

(Formula 1)

$$b = a * \tan\left(\frac{\theta 1}{2} + 2\right) - a * \tan\left(\frac{\theta 1}{2}\right)$$
$$= a * \left(\tan\left(\frac{\theta 1}{2} + 02\right) - \tan\left(\frac{\theta 1}{2}\right)\right)$$

(Formula 1)

When the angles θ1=θ2=θ3=50 degrees, the minimum length b in the horizontal direction is calculated using formula 2.

(Formula 2)

$$b = a * \tan\left(\frac{50°}{2} + 50°\right) - a * \tan\left(\frac{50°}{2}\right)$$
$$= a * (3.73 - 0.47)$$
$$= 3.26 * a$$

(Formula 2)

The virtual image emission point 25A is intersection point of edge lines of the view of the light projection and light reception unit 20A. The virtual image emission point 25C is intersection point of edge lines of the view of the light projection and light reception unit 20C. Thus, the virtual image emission points 25A, 25C are different from the respective actual light emitting points. Relations of the light emitting points of the light projection and light reception units 20A, 20C with the respective virtual image emission points 25A, 25C can be preliminary known. Thus, when the length of the outer surface 13a of the window 13 in the horizontal direction is defined as the minimum length b, the distance from the window 13a to each of the light projection and light reception units 20A, 20C can be determined.

Summary of First Embodiment

The optical distance measuring apparatus 1 of the first embodiment includes the multiple light projection and light reception units 20A, 20B, 20C. This configuration can detect the target in the wide angle range with the simple configuration compared with a configuration in which an apparatus moves in a distance measuring area using a rotation mirror.

The optical paths 23A, 23B, 23C of the respective light projection and light reception units 20A, 20B, 20C, overlap in the opening face 12 with one another. With this configuration, the opening face 12 can be smaller than an opening face 12 in which the optical paths 23A, 23B, 23C does not overlap.

Figure 7:
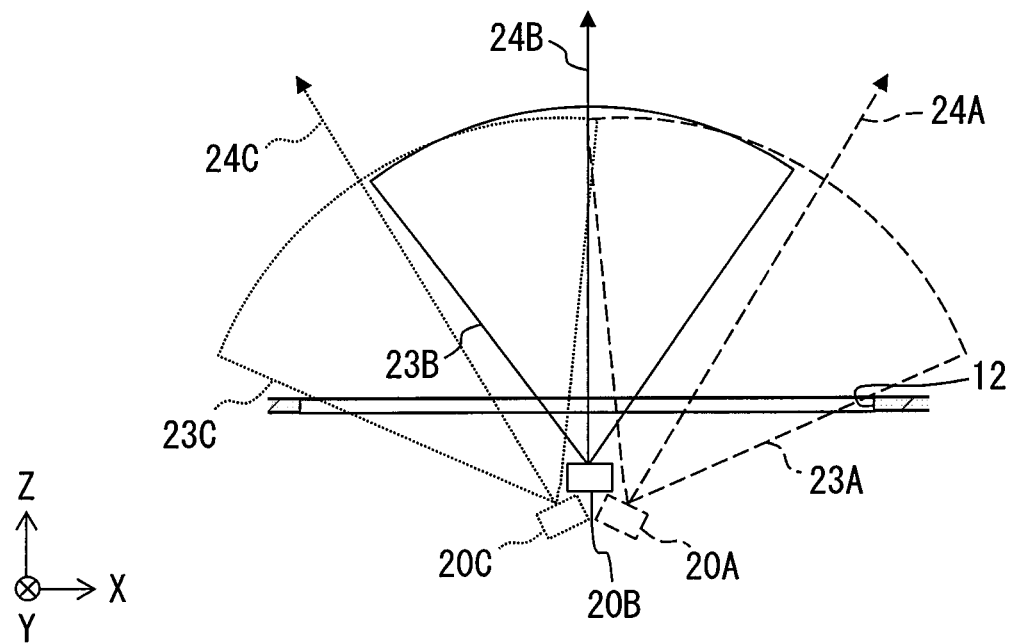
FIG. 7 is a diagram showing an arrangement of the light projection and light reception units of an optical distance measuring apparatus according to a first modification.

In the optical distance measuring apparatus 1 of the first embodiment, the optical paths 23A, 23B, 23C overlap in the opening face 12, and the optical axes 24A, 24B, 24C intersect with one another. In a first modification shown in FIG. 7, which is different from the configuration of the first embodiment, the optical paths 23A, 23B, 23C overlap in the opening face 12, but the optical axes 24A, 24B, 24C does not intersect with one another. The optical distance measuring apparatus 1 of the first embodiment, which arranges the light projection and light reception units 20A, 20B, 20C so that the optical axes 24A, 24B, 24C intersect with one another, can widen the overlap of the optical paths 23A, 23B, 23C in the opening face 12 compared with the optical distance measuring apparatus of the first modification. Thus, the opening face 12 of the first embodiment can be smaller than the opening face 12 of the first modification.

In the first modification, the light projection and light reception units 20A, 20B, 20C are arranged so that the optical paths 23A, 23B, 23C overlap in the opening face 12. Thus, when an optical distance measuring apparatus include equal to or more than three optical paths, one optical path need not overlap with all of the remaining optical paths in the opening face 12. At least two optical paths may overlap with one another in the opening face 12. In this case, the opening face 12 can be smaller compared with a case where no optical path overlaps in the opening face 12.

Second Embodiment

A second embodiment will be described. In each embodiment from the second embodiment, a portion denoted by the same reference symbol that has been employed is same as the portion that has the same reference symbol in the previous embodiment, except when the portion is specially described. From the second embodiment, in the case where only a part of a configuration is described, the configuration that has been described can be employed in a remaining configuration.

Figure 8:
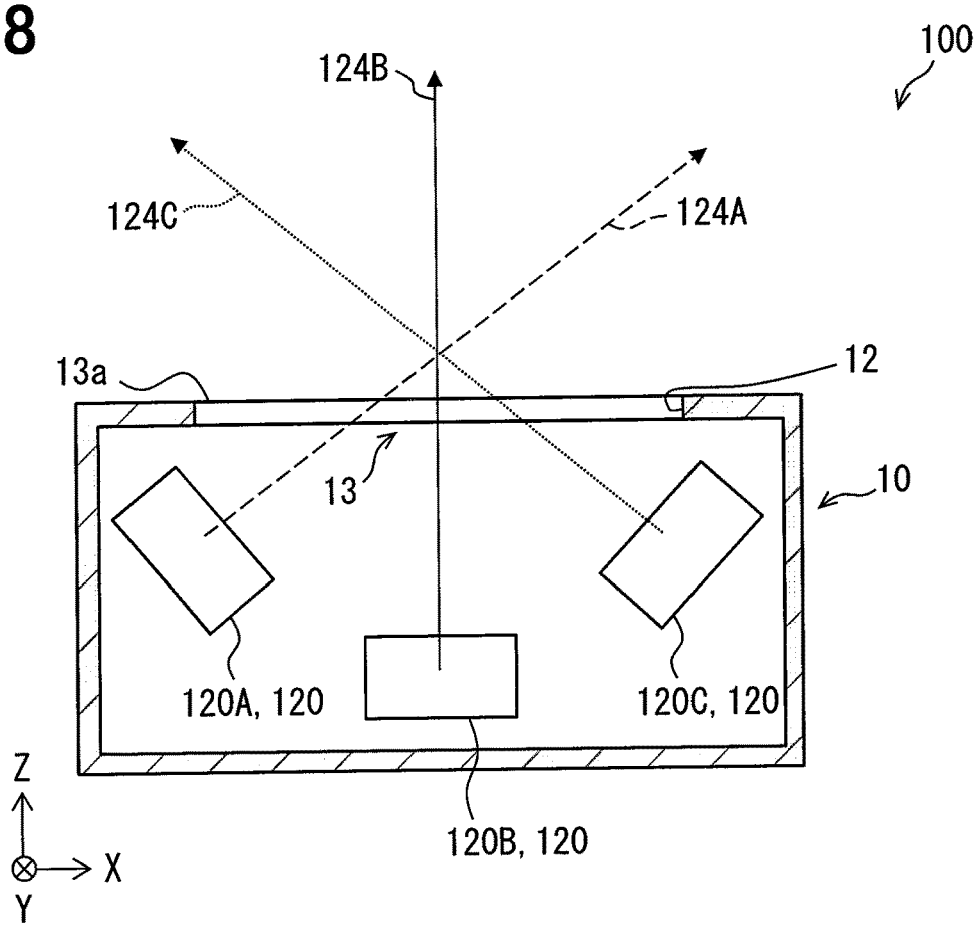
FIG. 8 is a diagram showing a configuration of the optical distance measuring apparatus according to a second embodiment.

As shown in FIG. 8, an optical distance measuring apparatus 100 of the second embodiment includes three light projection and light reception units 120A, 120B, 120C. Each of the light projection and light reception units 120A, 120B, 120C has a same configuration with one another. When there is no need to distinguish the three light projection and light reception units 120A, 120B, 120C, each of the light projection and light reception units 120A, 120B, 120C will be described as a light projection and light reception unit 120.

Figure 9:
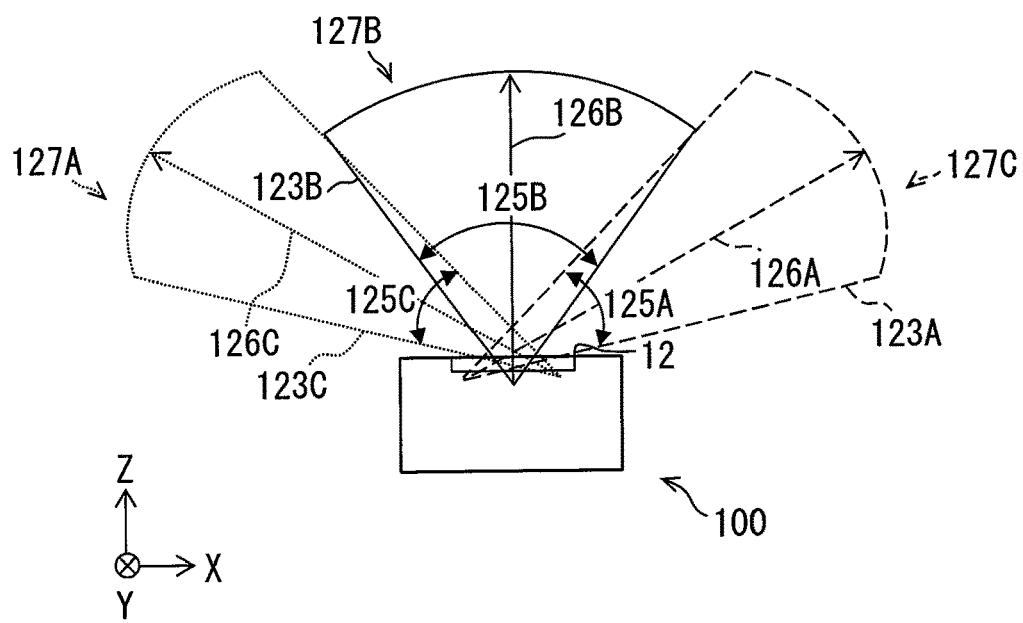
FIG. 9 is a diagram showing an entire detection range of the optical distance measuring apparatus according to the second embodiment.

Optical axes 124A, 124B, 124C of the respective light projection and light reception units 120A, 120B, 120C intersect at one point, which is similar to the first embodiment. As shown in FIG. 9, in the second embodiment, optical paths 123A, 123B, 123C of the respective light projection and light reception units 120A, 120B, 120C overlap with one another in the opening face 12. In FIG. 9, the light projection and light reception units 120A, 120B, 120C are omitted.

Difference between each of the light projection and light reception units 120A, 120B, 120C and the light projection and light reception unit 20 of the first embodiment is a detection range. In detection ranges 127A, 127B, 127C, detection distances 126A, 126B, 126C and view angles 125A, 125B, 125C are defined, respectively. Each of the view angles 125A, 125C of a corresponding one of the light projection and light reception units 120A, 120C, has the same angle, and is narrower than the view angle 125B of the light projection and light reception unit 120B.

Each of the light projection and light reception units 120A, 120B, 120C includes the light emitting element 211 that is included in the light projection and light reception unit 20 of the first embodiment. In each of the light projection and light reception units 120A, 120B, 120C, the view angle is adjusted by the light projection lens that deflects the projection light emitted from the light emitting element 211. The view angle of each of the light projection and light reception units 120A, 120C is relatively narrow compared with the view angle of the light projection and light reception unit 120B. Thus, power density of each of the light projection and light reception units 120A, 120C is relatively high compared with power density of the light projection and light reception unit 120B. Each of the light projection and light reception units 120A, 120B, 120C includes the light reception portion 22 that is included in the light projection and light reception unit 20 of the first embodiment. Light sensitivity of each of the light projection and light reception units 120A, 120B, 120C is same as light sensitivity of the light projection and light reception unit 20 of the first embodiment.

With the above-described configuration, as shown in FIG. 9, the detection distances 126A, 126C of the respective light projection and light reception units 120A, 120C are longer than the detection distance 126B of the light projection and light reception unit 120B. Thus, in the optical distance measuring apparatus 100 of the second embodiment, each of detection distances which is included in a corresponding one of detection angle range ends in the z-axis direction of the entire apparatus (that is, a front direction of the optical distance measuring apparatus 100) is longer than the detection distance of the optical distance measuring apparatus 1 of the first embodiment.

Figure 10:
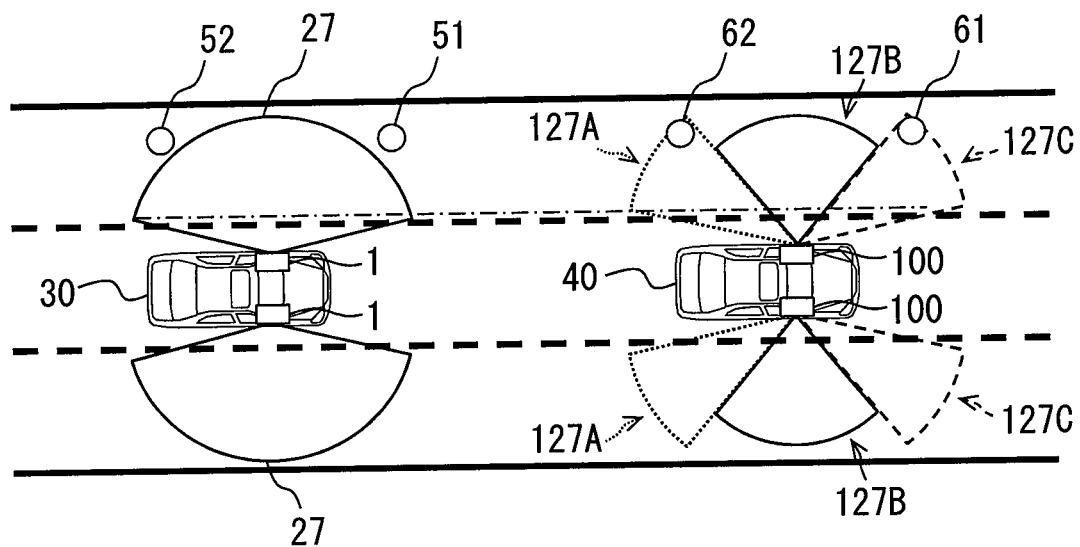
FIG. 10 is a diagram showing a detection range comparison between the optical distance measuring apparatus according to the first embodiment and the optical distance measuring apparatus according to the second embodiment.

The optical distance measuring apparatus 100 has the long detection distance in the z-axis direction at the both detection angle range ends of the entire apparatus, that is, at portions that are farthest in the front direction. The optical distance measuring apparatus 100 may be attached to a side portion of the vehicle. In FIG. 10, the optical distance measuring apparatuses 1, 100 are attached to the same positions of the both sides of the respective vehicles 30, 40. The front directions of the optical distance measuring apparatuses 1, 100 are in lateral directions of the respective vehicles 30, 40. A relative position of a target 51 to the vehicle 30 is same as a relative position of a target 61 to the vehicle 40. A relative position of a target 52 to the vehicle 30 is also same as a relative position of a target 62 to the vehicle 40.

As shown in FIG. 10, the targets 51, 52 are located outside a detection range 27 of the optical distance measuring apparatus 1. Thus, the optical distance measuring apparatus 1 is incapable of detecting the targets 51, 52. On the other hand, the objects 61, 62 are located in detection ranges 127A, 127C of the optical distance measuring apparatus 100. Thus, the optical distance measuring apparatus 100 is capable of detecting the targets 61, 62. As shown in FIG. 9, the detection ranges 127A, 127B, 127C partially overlap with one another, but, in FIG. 10, the partial overlap of the detection ranges 127A, 127B, 127C is omitted for simplification.

Common Description for Third to Sixth Embodiment

As shown in FIGS. 11, 12, 13, and 14, each of optical distance measuring apparatuses 300, 400, 500, 600 of a corresponding one of third, fourth, fifth, and sixth embodiments includes the three light projection and light reception units 20A, 20B, 20C, which are same as the first embodiment. The light projection and light reception units 20A, 20B, 20C are arranged in the housing 10 so that the optical axes 24A, 24B, 24C of the respective light projection and light reception units 20A, 20B, 20C are set similar to the first embodiment. Thus, in each of the third, fourth, fifth, and sixth embodiments, the optical paths of the light projection and light reception unit 20A, 20B, 20C overlap with one another in the opening face 12. Each of the optical distance measuring apparatuses 300, 400, 500, 600 of the corresponding one of the third, fourth, fifth, and sixth embodiments can provide advantages similar to the optical distance measuring apparatus 1 of the first embodiment.

The difference between each of the third, fourth, fifth, and sixth embodiments and the first embodiment is a window that covers the opening face 12 of the housing 10. Each of windows 313, 413, 513, 613 in the corresponding one of the third, fourth, fifth, and sixth embodiment corresponds to a light transmissive cover.

Third Embodiment

Figure 11:
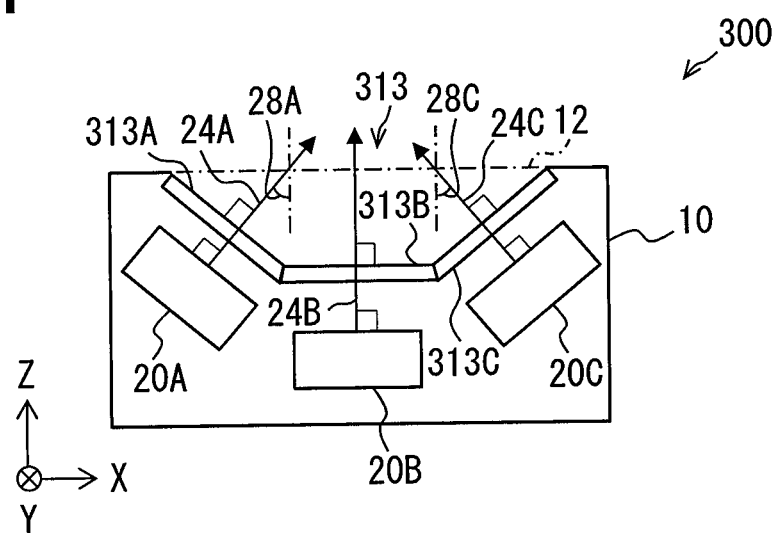
FIG. 11 is a diagram showing a configuration of an optical distance measuring apparatus according to a third embodiment.

As shown in FIG. 11, the window 313 of the optical distance measuring apparatus 300 of the third embodiment protrudes toward the inside of the housing 10 with reference to the opening face 12. The window 313 includes side portions 313A, 313C and a center portion 313B. The side portions 313A, 313C and the center portion 313B have plate shapes.

The side portion 313A is arranged perpendicular to the optical axis 24A of the light projection and light reception unit 20A. The side portion 313C is arranged perpendicular to the optical axis 24C of the light projection and light reception unit 20C. The aide portion 313B is arranged perpendicular to the optical axis 24B of the light projection and light reception unit 20B.

An incident angle at which the optical axis 24B enters the window 313 is same as an incident angle at which the optical axis 24B enters the opening face 12. An incident angle (that is, 0 degrees) at which the optical axis 24A enters the window 313 is smaller than an angle 28A at which the optical axis 24A enters the opening face 12. An incident angle (that is, 0 degrees) at which the optical axis 24C enters the window 313 is smaller than an angle 28C at which the optical axis 24C enters the opening face 12. With this configuration, a Fresnel reflection in response to the input of the projection light to the window 313 can be restricted compared with the case where the window 13 has a flat plate shape and covers the opening face 12 in the first embodiment. The Fresnel reflection is restricted due to the shape of the window 313, so the Fresnel reflection can be restricted even at a high temperature.

The window 313 is recessed toward the inside of the housing 10 with reference to the opening face 12. This configuration can downsize the optical distance measuring apparatus 300 in a depth direction. This configuration can also restrict a damage of the window 313.

Fourth Embodiment

Figure 12:
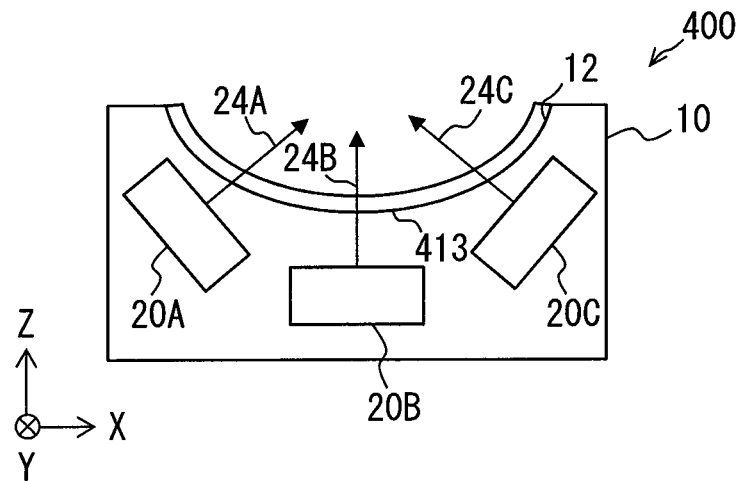
FIG. 12 is a diagram showing a configuration of an optical distance measuring apparatus according to a fourth embodiment.

As shown in FIG. 12, a window 413 of the optical distance measuring apparatus 400 of the fourth embodiment has a convex curve shape. An inner surface and an outer surface of the window 413 protrude toward the inside of the housing 10. Apexes of the convex curve surfaces are arranged at the center of the width direction of the window 413, and the optical axis 24B of the light projection and light reception unit 20B passes through the apex.

With the above-described window 413, in all ranges except the direction of the optical axis 24B, the angle at which the projection light enters the window 413 is smaller than the corresponding angle of the first embodiment. With this configuration, the Fresnel reflection in response to the input of the projection light to the window 413 can be restricted.

In the fourth embodiment, the shape of the window 413 can restrict the Fresnel reflection even at a high temperature, similarly to the third embodiment. The window 413 is recessed toward the inside of the housing 10 with reference to the opening face 12. This configuration can downsize the optical distance measuring apparatus 400 in a depth direction. This configuration can also restrict a damage of the window 413.

Fifth Embodiment

Figure 13:
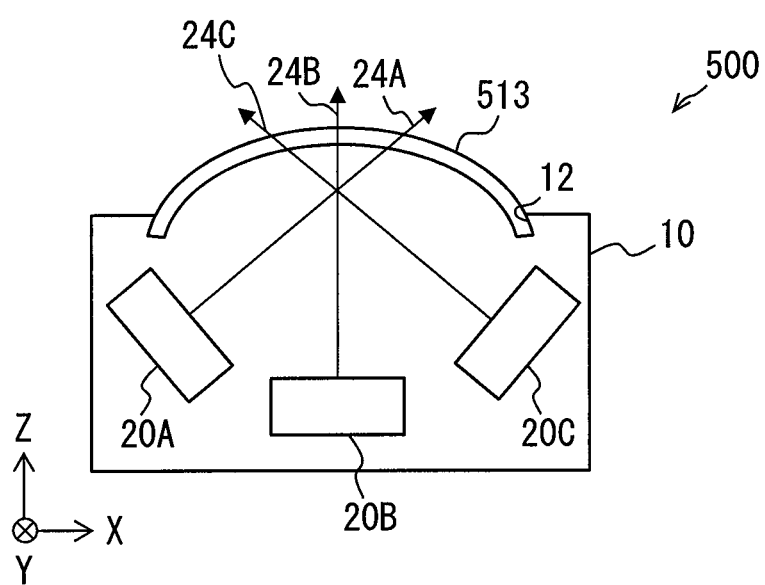
FIG. 13 is a diagram showing a configuration of an optical distance measuring apparatus according to a fifth embodiment.

As shown in FIG. 13, a window 513 of the optical distance measuring apparatus 500 of the fifth embodiment has a convex curve shape. An inner surface and an outer surface of the window 513 protrude toward the outside of the housing 10, which is opposite to the configuration of the fourth embodiment. Apexes of the convex curve surfaces are arranged at the center of the width direction of the window 513, and the optical axis 24B of the light projection and light reception unit 20B passes through the apex.

With the above-described window 513, in all ranges except the direction of the optical axis 24B, the angle at which the projection light enters the window 513 is smaller than the corresponding angle of the first embodiment. With this configuration, the Fresnel reflection in response to the input of the projection light to the window 513 can be restricted. In the fifth embodiment, the shape of the window 513 can restrict the Fresnel reflection even at a high temperature.

Sixth Embodiment

Figure 14:
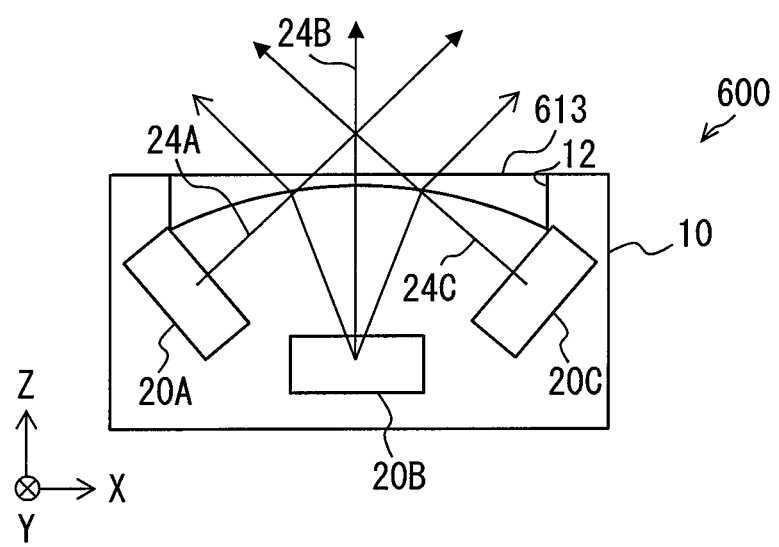
FIG. 14 is a diagram showing a configuration of an optical distance measuring apparatus according to a sixth embodiment.

As shown in FIG. 14, in a window 613 of the optical distance measuring apparatus 600 of the sixth embodiment, an inner surface, which is oriented toward the inside of the optical distance measuring apparatus 600, has a concave curve shape. The window 613 has the concave curve shape so as to deflect the projection light emitted from the light projection and light reception unit 20 in a wide range. The entire view angle of the optical distance measuring apparatus 600 may be set to equal to the entire view angle of the optical distance measuring apparatus 1 of the first embodiment. In this case, in the sixth embodiment, the angle range of the projection light emitted from the light projection and light reception unit 20 and the angle range of the reflected light received by the light projection and light reception unit 20 can be small compared with the configuration of the first embodiment.

When the light projection portion 21 deflects the projection light in the wide range, the number of lenses needs to be increased or a lens needs to be provided by a lens that is difficult to be manufactured. Thus, in the light projection portion 21, the lens that has a narrow deflection angle can reduce a manufacturing cost compared with the lens that has a wide deflection angle. When the light reception portion 22 receives the light in the wide range, the number of lenses needs to be increased or a lens needs to be provided by a lens that is difficult to be manufactured. In the sixth embodiment, with the configuration of the window 613, which has the concave lens shape, the manufacturing cost can be reduced.

Seventh Embodiment

Figure 15:
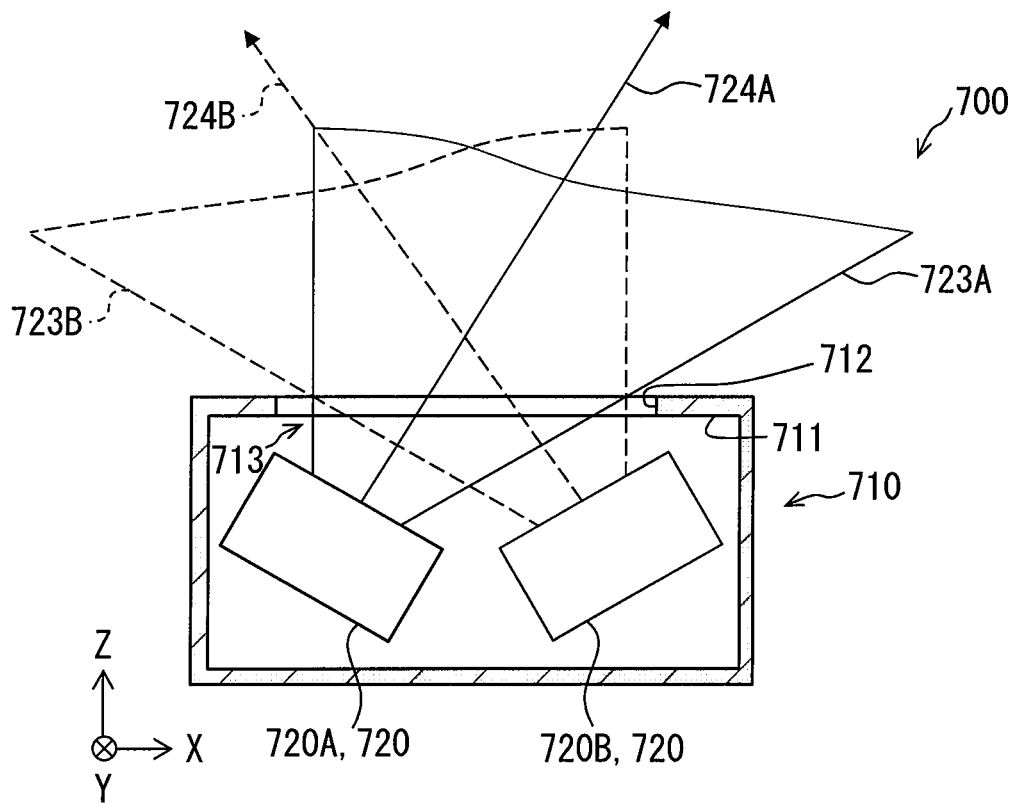
FIG. 15 is a diagram showing a configuration of an optical distance measuring apparatus according to a seventh embodiment.

Each of the optical distance measuring apparatuses 1, 100, 300, 400, 500, 600 that has been described includes the three light projection and light reception units 20 or the three light projection and light reception units 120. As shown in FIG. 15, an optical distance measuring apparatus 700 of a seventh embodiment includes two light projection and light reception units 720A, 720B in a housing 710. The optical distance measuring apparatus 700 may be attached to the vehicle, which is similar to the optical distance measuring apparatus 1 of the first embodiment. As shown in FIG. 15, a z-axis direction of the optical distance measuring apparatus 700 is in a lateral direction of the vehicle.

The housing 710 has a cuboid shape, and an opening face 712 is defined on a front wall 711 of the housing 710. A window 713, which is provided by a light transmissive member, covers the opening face 712.

Each of the two light projection and light reception units 720A, 720B has the same configuration with one another. When there is no need to distinguish the two light projection and light reception units 720A, 720B, each of the light projection and light reception units 720A, 720B will be described as a light projection and light reception unit 720. The light projection and light reception unit 720 corresponds to the light projection and light reception portion.

The light projection and light reception unit 720, similarly to the light projection and light reception unit 20 of the first embodiment, includes a light projection portion and a light reception portion. The configurations of the light projection portion and the light reception portion included in the light projection and light reception unit 720 are same as the configurations of the light projection portion 21 and the light reception portion 22 of the first embodiment, respectively. The difference between the light projection and light reception unit 720 and the light projection and light reception unit 20 of the first embodiment is a view angle. The light projection and light reception unit 720 of the seventh embodiment has a wider view angle than the light projection and light reception unit 20 of the first embodiment. The view angle of the light projection and light reception unit 720 may be set to 62.5 degrees. In order to widen the view angle of the light projection and light reception unit 720, a deflection angle of a light projection lens or a size of a light reception lens may be adjusted.

As shown in FIG. 15, an optical path 723A of the light projection and light reception unit 720A and an optical path 723B of the light projection and light reception unit 720B pass through the opening face 712. The two optical paths 723A, 723B completely overlap with one another in the opening face 712. That is, in the opening face 712, a position where the optical path 723A passes corresponds to the position where the optical path 723B passes. The optical axes 724A, 724B of the respective optical paths 723A, 723B intersect at a one point.

Figure 16:
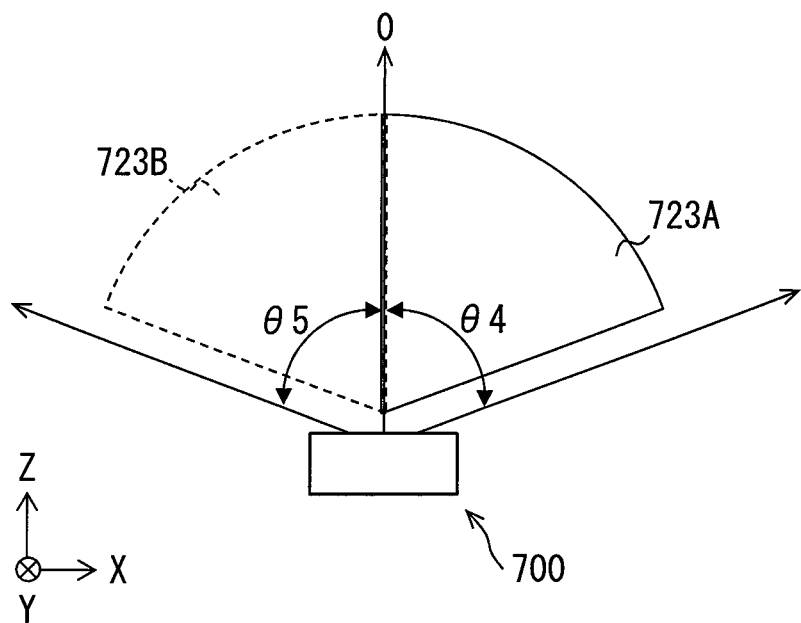
FIG. 16 is a diagram showing an entire view angle in a horizontal direction of the optical distance measuring apparatus.

As shown in FIG. 16, an entire view angle in the horizontal direction of the optical distance measuring apparatus 700 is set to an angle $\theta4+\theta5$. An angle $\theta4$ represents a view angle of the light projection and light reception unit 720A. An angle $\theta5$ represents a view angle of the light projection and light reception unit 720B. When the angle $\theta4$ and the angle $\theta5$ are set to 62.5 degrees, the entire view angle in the horizontal direction of the optical distance measuring apparatus 700 becomes 125 degrees.

Figure 17:
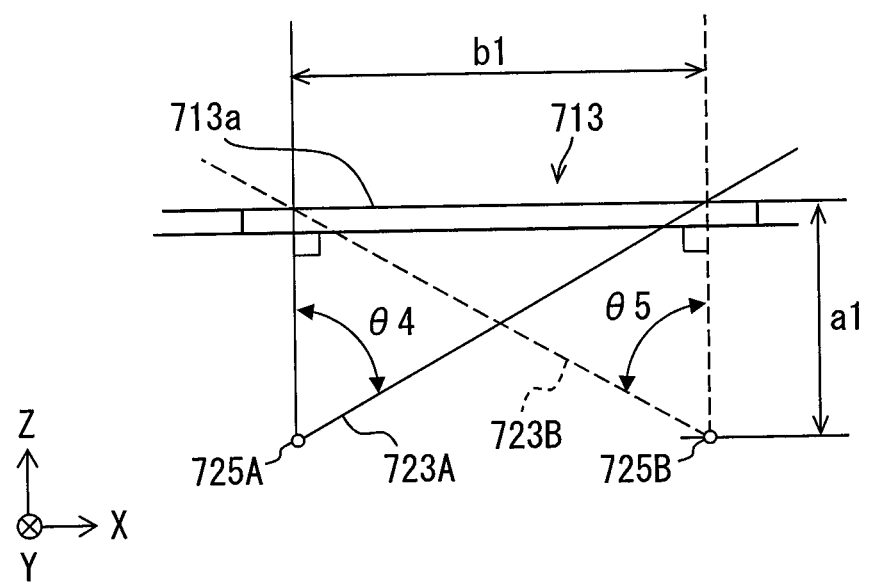
FIG. 17 is a diagram showing an enlarged view of a periphery of the optical distance measuring apparatus shown in FIG. 16.

As shown in FIG. 17, when the two optical paths 723A, 723B overlap on an outer surface 713a of the window 713, a minimum length b1 of the outer surface 713a of the window 713 in the horizontal direction satisfies the following formula 3. In formula 3, a distance a1 is defined as a distance from the outer surface 713a of the window 713 to each of virtual image emission points 725A, 725B. Formula 3 is calculated in a case where the angles satisfy θ4≥θ5. In a case where the angles satisfy θ4<θ5, the angle θ5 is employed instead of the angle θ4 in formula 3.

$$b1=a1*\tan(\theta 4) \quad \text{(Formula 3)}$$

In the seventh embodiment, the two light projection and light reception units 720A, 720B are included in the housing 710. Thus, a manufacturing cost can be reduced compared with the case where the three light projection and light reception unit is included in a housing.

Eighth Embodiment

Figure 18:
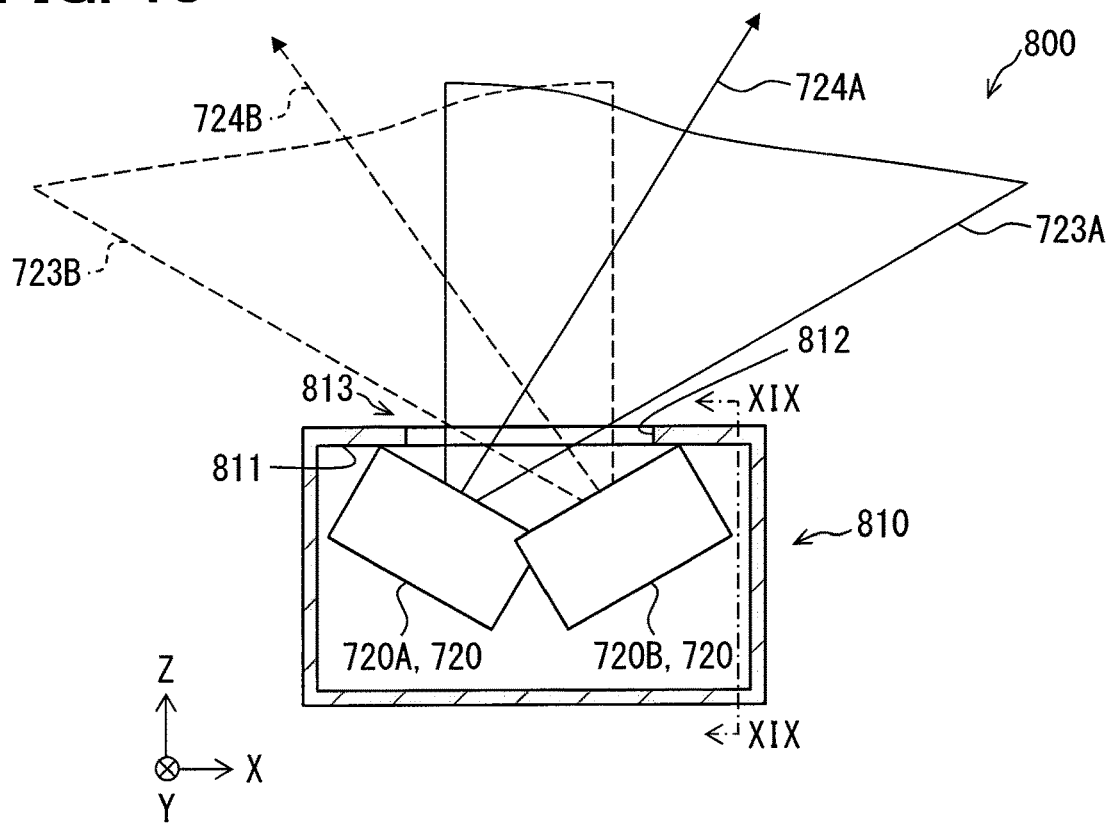
FIG. 18 is a diagram showing a configuration of an optical distance measuring apparatus according to an eighth embodiment.

As shown in FIG. 18, the optical distance measuring apparatus 800 of an eighth embodiment, similarly to the optical distance measuring apparatus 700 of the seventh embodiment, includes two light projection and light reception unit 720A, 720B. A housing 810 houses the two light projection and light reception units 720A, 720B.

The housing 810, similarly to the housing 710 of the seventh embodiment, has a cuboid shape. The housing 810 has room in a vertical direction so that the two light projection and light reception units 720A, 720B are arranged in different positions in the vertical direction.

As shown in FIG. 18, seen from a y-axis direction, that is, seen from the vertical direction, the two light projection and light reception units 720A, 720B partially overlap. In order to arrange the two light projection and light reception units 720A, 720B described above, as shown in FIG. 19, the two light projection and light reception units 720A, 720B are arranged at different positions without overlapping in the vertical direction.

Two optical paths 723A, 723B are combined so that, in the horizontal direction, an entire view angle of the optical distance measuring apparatus 800 is wider than a view angle of one of the light projection and light reception units 720A, 720B. The view angle of the optical distance measuring apparatus 800, similarly to the seventh embodiment, becomes 125 degrees.

The direction in which the view angle of the optical distance measuring apparatus 800 is wider than the view angle of one of the light projection and light reception units 720A, 720B is horizontal direction.

Figure 19:
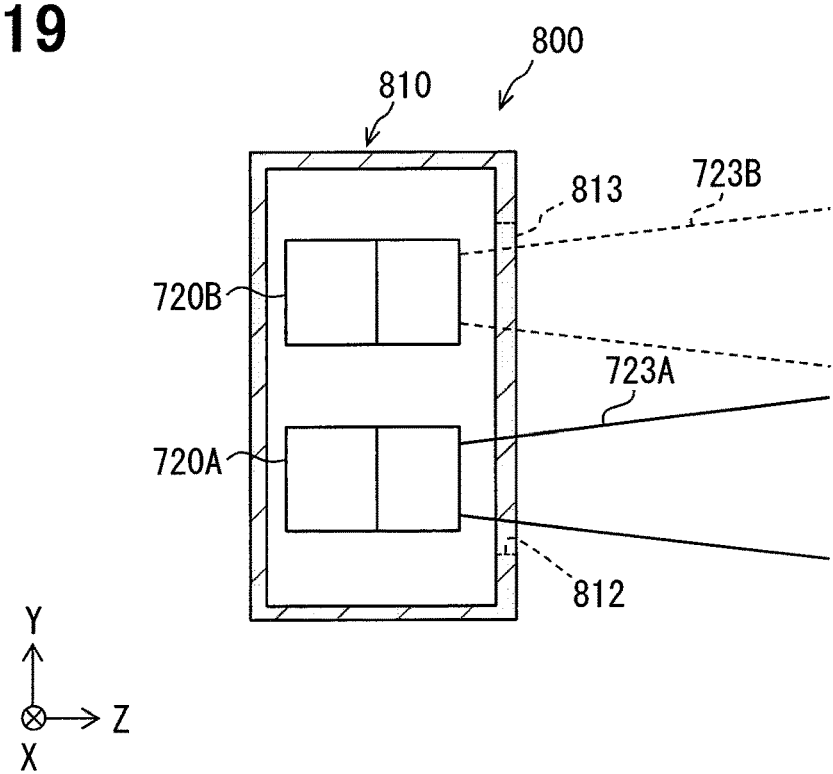
FIG. 19 is a cross-section view taken along a line XIX-XIX of FIG. 18.
Figure 20:
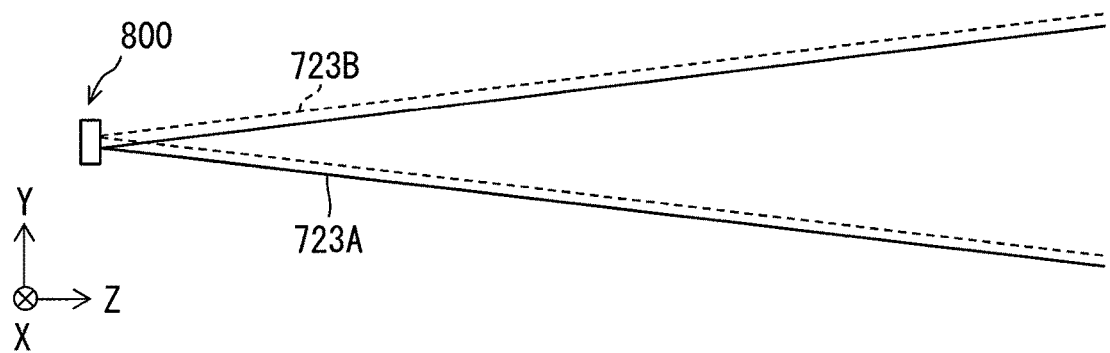
FIG. 20 is an entire optical path of the light projection and light reception unit.

In FIG. 19, it seems that the view is also widened in the vertical direction. FIG. 20 shows the entire optical paths 723A, 723B of the respective light projection and light reception units 720A, 720B in the optical distance measuring apparatus 800. As shown in FIG. 20, the optical paths 723A, 723B are considered as mostly overlapping with one another in the vertical direction. Thus, in the eighth embodiment, in the vertical direction, the entire view angle of the optical distance measuring apparatus 800 is not wider than the view angle of one of the light projection and light reception units 720A, 720B.

The projection light may be provided by a diffused light. In this case, as shown in FIG. 20, seen from a direction parallel to a xy plane, the optical paths 723A, 723B become wide in the y-axis direction in a direction away from the measuring apparatus 800. In this configuration, the two optical paths 723A, 723B are considered as mostly overlapping with one another. Thus, in the vertical direction, the entire view angle of the optical distance measuring apparatus 800 is not wider than one of the light projection and light reception units 720A, 720B.

As shown in FIG. 19, in the eighth embodiment, the positions in the y-axis direction of the light projection and light reception unit 720A and the position in the y-axis direction of the light projection and light reception unit 720B are different from one another. With this configuration, the two optical paths 723A, 723B do not overlap with one another in an opening face 812.

As shown in FIG. 18, seen from the y-axis direction, the two optical paths 723A, 723B overlap with one another in the opening face 812. In addition, seen from the y-axis direction, the optical axes 724A, 724B intersect at one point.

In the eighth embodiment, the y-axis direction is set to be perpendicular to the direction in which the entire view angle of the optical distance measuring apparatus 800 is wider than the view angle of one of the light projection and light reception units 720A, 720B by combining the two optical paths 723A, 723B.

Seen from the y-axis direction, the two optical paths 723A, 723B overlap in the opening face 812. Thus, in the present embodiment, seen from the y-axis direction, a length of the opening face 812 in an x-axis direction is shorter than a length of the opening face when the two optical paths 723A, 723B do not overlap in the opening face 812.

Ninth Embodiment

Figure 21:
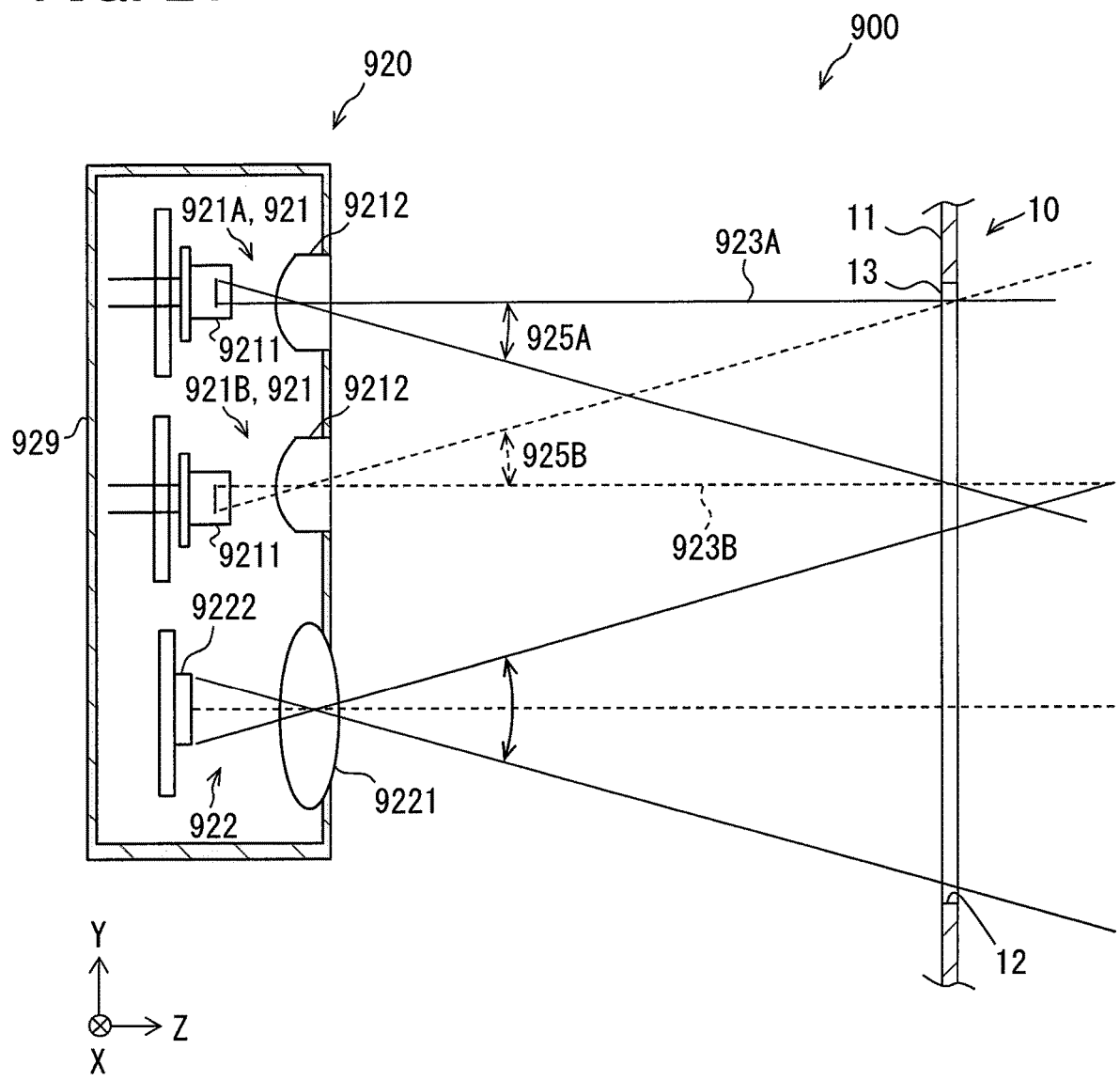
FIG. 21 is a diagram showing a configuration of an optical distance measuring apparatus according to a ninth embodiment.

FIG. 21 shows an optical distance measuring apparatus 900 according to a ninth embodiment. The optical distance measuring apparatus 900 includes a light projection and light reception unit 920 instead of the light projection and light reception unit 20 of the first embodiment. The light projection and light reception unit 920 corresponds to the light projection and light reception portion.

FIG. 21 shows one light projection and light reception unit 920, but the optical distance measuring apparatus 900 includes three light projection and light reception units 920. The three respective light projection and light reception units 920 are arranged at the same positions where the three light projection and light reception units 20A, 20B, 20C are arranged. The three light projection and light reception units 920 are arranged in the housing 10. In the housing 10, similarly to the first embodiment, the opening face 12 is defined on the front wall 11, and the window 13 covers the opening face 12.

The light projection and light reception unit 920 includes two light projection portions 921 and one light reception portion 922, which are accommodated in one unit housing 929. The two light projection portions 921 include an upper light projection portion 921A and a lower light projection portion 921B. The upper light projection portion 921A, the lower light projection portion 921B, and the light reception portion 922 are arranged in described order from a top in the y-axis direction.

Each of the upper light projection portion 921A and the lower light projection portion 921B includes a light emitting element 9211 and a light projection lens 9212. The light emitting elements 9211 emit projection light toward the respective light projection lenses 9212. The two light projection lenses 9212 deflects the light and outputs the deflected light. The two light projection lenses 9212 are arranged so that the respective optical axes are in the horizontal direction.

Each relative position of the light emitting element 9211 to the light projection lens 9212 in the upper light projection portion 921A and the lower light projection portion 921B is different from one another. In the upper light projection portion 921A, a part from which the light emitting element 9211 emits the projection light is arranged above the optical axis of the light projection lens 9212. With this configuration, a view angle 925A of the upper light projection portion 921A is set below the optical axis of the light projection lens 9212.

In the lower light projection portion 921B, a part from which the light emitting element 9211 emits the projection light is arranged below the optical axis of the light projection lens 9212. With this configuration, a view angle 925B of the upper light projection portion 921B is set above the optical axis of the light projection lens 9212. As shown in FIG. 21, each of the view angle 925A of the upper light projection portion 921A and the view angle 925B of the lower light projection portion 921B represents an angle at which the optical path of the projection light spreads. The optical path 923A of the upper light projection portion 921A and the optical path 923B of the lower light projection portion 921B completely overlap in the opening face 12 in the vertical direction.

The light reception portion 922 includes a light reception lens 9221 and a light receiving element 9222. The light reception lens 9221 collects reflected light generated by the projection light emitted from the upper light projection portion 921A and reflected light generated by the projection light emitted from the upper light projection portion 921B. The light reception lens 9221 transfers the collected light to the light receiving element 9222. The light receiving element 9222 detects the reflected light collected by the light reception lens 9221.

The light projection and light reception unit 920 includes two light projection portions 921A, 921B. With this configuration, the view in the vertical direction can be wider than the view in the case where one light projection portion 921 is included, or the number of the ranges in the vertical direction can be increased. In addition, the detection distance in the present embodiment can be maintained same as the detection distance when the one light projection portion 921 is included in the housing.

The optical path 923A of the upper light projection portion 921A and the optical path 923B of the lower light projection portion 921B completely overlap in the opening face 12 in the vertical direction. This configuration can downsize the opening face 12 in the vertical direction compared with the case in which the optical paths 923A, 923B does not overlap in the opening face 12.

In the present embodiment, the view angle in the horizontal direction of the light projection and light reception unit 920 is not limited. The view angle in the horizontal direction of the light projection and light reception unit 920 may be set to the same view angle in the horizontal direction of one of the above-described light projection and light reception units 20, 120, 720. In this case, the light projection and light reception unit 920 is employed instead of one of the light projection and light reception units 20, 120, 720.

Tenth Embodiment

Figure 22:
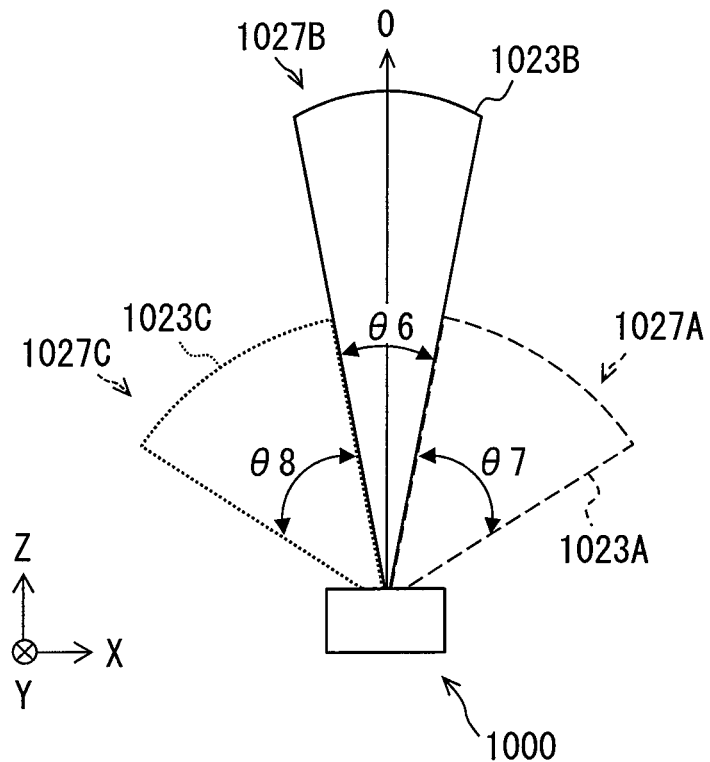
FIG. 22 is a diagram showing an optical path of an optical distance measuring apparatus according to a tenth embodiment.

FIG. 22 shows an optical distance measuring apparatus 1000 according to a tenth embodiment. In the optical distance measuring apparatus 1000 of the tenth embodiment, the view angles of light projection and light reception units 20A, 20B, 20C, which are included in the optical distance measuring apparatus 1 of the first embodiment, are changed. The difference between the first embodiment and the tenth embodiment is the view angles of three light projection and light reception units 20. Thus, a diagram of detailed configuration of the optical distance measuring apparatus 1000 according to the tenth embodiment is omitted. Same or similar portions are denoted by the same or the similar reference symbols, respectively, in the first embodiment.

The optical distance measuring apparatus 1000 includes the three light projection and light reception units 20A, 20B, 20C that have optical paths 1023A, 1023B, 1023C, respectively, as shown in FIG. 22. As described above, in the optical distance measuring apparatus 1000, the view angles of the three light projection and light reception units 20 of the first embodiment are changed. Thus, the optical paths 1023A, 1023B, 1023C overlap in the opening face 12 with one another, and optical axes of the optical paths 1023A, 1023B, 1023C intersect at one point.

The view angles of the three light projection and light reception units 20 of the first embodiment are changed, similarly to the second embodiment. In the second embodiment, the optical paths 123A, 123C of the three optical paths 123A, 123B, 123C, which are set to the ends of the entire angle range of the optical distance measuring apparatus 100, are narrower than the optical path 123B, which is set to the front angle range of the optical distance measuring apparatus 100.

On the other hand, in the tenth embodiment, the optical path 1023B, which is set to the front angle range of the optical distance measuring apparatus 1000, is narrower than each of the optical paths 1023A, 1023C, which is set to the corresponding end of the entire angle range of the optical distance measuring apparatus 1000.

As shown in FIG. 22, angles $\theta 6, \theta 7, \theta 8$ correspond to the angles $\theta 1, \theta 2, \theta 3$ of the first embodiment, respectively. The angle $\theta 7$ represents the view angle in the horizontal direction of the light projection and light reception unit 20A. The angle $\theta 8$ represents the view angle in the horizontal direction of the light projection and light reception unit 20C. The angle $\theta 6$ represents a view angle in the horizontal direction of the light projection and light reception unit 20B which does not overlap with the view angles in the horizontal direction of the light projection and light reception units 20A, 20C.

The optical path 1023B is relatively narrow compared with the optical paths 1023A, 1023C, which is opposite to the second embodiment. As shown in FIG. 22, a detection distance of a detection range 1027B, which is set to the front angle range of the optical distance measuring apparatus 1000, is longer than a detection distance of each detection range 1027A, 1027C, which is set to one end of the entire angle range of the optical distance measuring apparatus 1000, that is, a portion that is farthest in the front direction. The detection ranges 1027A, 1027B, 1027C are the detection ranges that are set to the light projection and light reception units 20A, 20B, 20C, respectively.

Figure 23:
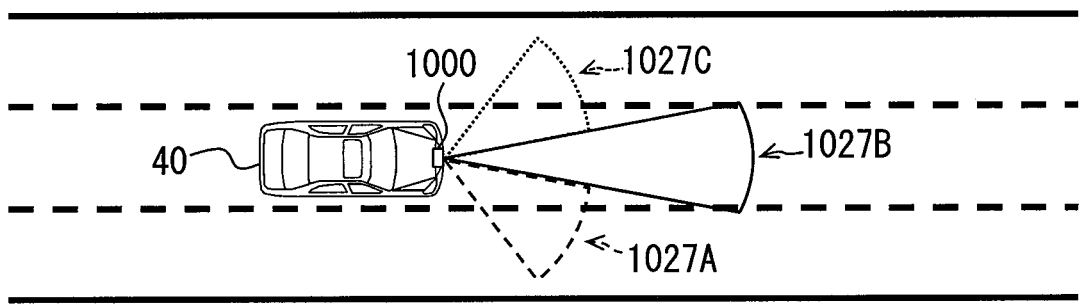
FIG. 23 is a diagram showing a configuration in which optical distance measuring apparatus is attached to a front edge of a vehicle.

As shown in FIG. 23, the optical distance measuring apparatus 1000 of the tenth embodiment is attached to a front portion of the vehicle 40. The optical distance measuring apparatus 1000 provides the detection range in a traveling direction of the vehicle 40. When the optical distance measuring apparatus 1000 is attached to the front portion of the vehicle 40, the front detection distance of the vehicle 40 can be set to be longer than a diagonally front detection distance of the vehicle 40.

Embodiments of the present disclosure have been described above. The present disclosure may be implemented in various other modifications, and the modifications will be described below.

Second Modification

In the above-described embodiment, each of the light projection and light reception units 20, 120, 720, 920 includes the two or three light projection and light reception units. Alternatively, each of the light projection and light reception units 20, 120, 720, 920 may include equal to or more than four light projection and light reception units.

Third Modification

In the window 613 of the sixth embodiment, the inner surface, which is oriented toward the inside of the optical distance measuring apparatus 600, has the concave curve shape. Alternatively, the outer surface, which is oriented toward the outside of the optical distance measuring apparatus 600, may have the concave curve shape.

Fourth Modification

When the object is to restrict the Fresnel reflection, the optical paths 23A, 23B, 23C of the respective light projection and light reception units 20A, 20B, 20C need not overlap with one another in the opening face 12. Thus, in the fifth embodiment, the position of the light projection and light reception unit 20A and the position of the light projection and light reception unit 20C may be changed by one another.

Fifth Modification

The light projection and light reception units 120A, 120B, 120C may be employed instead of the light projection and light reception units 20A, 20B, 20C, respectively.

Sixth Modification

In the second embodiment, the light projection and light reception units 20A, 20B, 20C may be employed instead of the light projection and light reception units 120A, 120B, 120C, respectively. In this case, a light emission power of the light emitting element 211 of the light projection and light reception unit 20B is set to lower than a light emission power of the light emitting element 211 of each of the light projection and light reception units 20A, 20C.

With this configuration, the detection distance of each of the light projection and light reception units 20A, 20C can be longer than the detection distance of the light projection and light reception unit 20B. The view angle of each of the light projection and light reception units 20A, 20C is set to one of the end angle ranges of the optical distance measuring apparatus 100. The view angle of light projection and light reception unit 20B is set to the front view angle of the optical distance measuring apparatus 100.

Seventh Modification

The optical distance measuring apparatus 1000 of the tenth embodiment may be attached to a rear portion of the vehicle 40.

Eighth Modification

In the ninth embodiment, the light emitting element 9211 is set above or below the optical axis of the light projection lens 9212. Alternatively, the light emitting element 9211 may be set on the optical axis of the light projection lens 9212, and the light emitting element 9211 and the light projection lens 9212 may rotate in the vertical plane. This configuration can widen the view in the vertical direction, or increase the number of the ranges in the vertical direction.

Ninth Modification

In the second embodiment, the light projection and light reception unit 120C may be removed. In this case, the detection range 127A, which is directed to the rear of the vehicle 40, is removed in the three detection ranges 127A, 127B, 127C shown in FIG. 10. In some system that employ a measurement result of the optical distance measuring apparatus 100, the optical distance measuring apparatus 100 need not measure the distance of the target that exist in the rear of the vehicle 40. In this case, as described above, the light projection and light reception unit 120C may be removed.

When the light projection and light reception unit 120C is removed, the light projection and light reception unit 120A is the farthest view angle along the front direction of the optical distance measuring apparatus 100 in the entire angle range of the optical distance measuring apparatus 100. The detection distance of the light projection and light reception unit 120A is longer than the detection distance of the light projection and light reception unit 120B in which the view angle is set to the front view angle of the optical distance measuring apparatus 100.

On the other hand, in another system, the detection range 127C, which is directed to the front of the vehicle 40, may not be needed. In this case, the light projection and light reception unit 120A is removed.

Tenth Modification

In the tenth embodiment, one of the light projection and light reception units 20A, 20C may be removed. In this case, one of the detection ranges 1027A, 1027C is removed from the three detection ranges 1027A, 1027B, 1027C.

In the tenth embodiment, when the light projection and light reception unit 20A is removed, the light projection and light reception unit 20C is the farthest view angle along the front direction of the optical distance measuring apparatus 1000 in the entire angle range of the optical distance measuring apparatus 1000. In the light projection and light reception unit 20B, which is set to the front view angle of the optical distance measuring apparatus 1000, the detection distance is longer and the view angle is narrower compared with the light projection and light reception unit 20C.

The invention claimed is:

1. An optical distance measuring apparatus comprising:
a housing including an opening face; and
a plurality of light projection and light reception portions configured to emit light and receive the light after the light is reflected, the plurality of light projection and light reception portions being accommodated in the housing, and the light being provided by laser light, wherein,
by combining optical paths of the plurality of light projection and light reception portions, a view angle of the optical distance measuring apparatus is widened compared with a view angle of one of the plurality of light projection and light reception portions, and the optical paths of the plurality of light projection and light reception portions overlap with one another in the opening face when seen from a direction perpendicular to a direction along which the view angle of the optical distance measuring apparatus is widened, the optical paths of the plurality of light projection and light reception portions overlap with one another in the opening face, the optical paths of the plurality of light projection and light reception portions are arranged within a minimum opening face, the plurality of light projection and light reception portions include a specific light projection and light reception portion, in a horizontal direction of the opening face, an optical path of the specific light projection and light reception portion is greater than the optical path of each remaining one of the plurality of light projection and light reception portions, and the minimum opening face is defined based on a view angle of the specific light projection and light reception portion and a distance between the opening face and a virtual image emission point of the specific light projection and light reception portion.

2. The optical distance measuring apparatus according to claim 1, wherein the optical paths of the plurality of light projection and light reception portions overlap with one another in the opening face, and optical axes of the plurality of light projection and light reception portions intersect with one another.

3. The optical distance measuring apparatus according to claim 1, wherein, by combining the optical paths of the plurality of light projection and light reception portions, in a horizontal direction, the view angle of the optical distance measuring apparatus is widened compared with the view angle of one of the plurality of light projection and light reception portions, and the plurality of light projection and light reception portions are arranged in the horizontal direction.

4. The optical distance measuring apparatus according to claim 1, wherein one of the plurality of light projection and light reception portions includes a plurality of light projection portions configured to emit the light, positions of the plurality of light projection portions differ from one another in a vertical direction, and the optical paths of the plurality of light projection portions overlap with one another in the opening face.

5. The optical distance measuring apparatus according to claim 1, further comprising a light transmissive cover attached to the opening face, wherein an optical axis of each of the plurality of light projection and light reception portions enters the light transmissive cover at an incident angle, at least one of the incident angles is smaller than an angle formed by the optical axis corresponding to the incident angle and the opening face, and each of the incident angles is equal to or smaller than the angle formed by the optical axis corresponding to the incident angle and the opening face.

6. The optical distance measuring apparatus according to claim 5, wherein the light transmissive cover has a shape that protrudes toward an inside of the housing with reference to the opening face.

7. The optical distance measuring apparatus according to claim 1, further comprising a light transmissive cover attached to the opening face and having a concave lens shape.

8. The optical distance measuring apparatus according to claim 1, wherein the view angle of one of the plurality of light projection and light reception portions includes an area farthest in a front direction among an entire detection angle range of the optical distance measuring apparatus, and the one of the plurality of light projection and light reception portions has a longer detection distance compared with another one of the plurality of light projection and light reception portions, in which the another one of the plurality of light projection and light reception on portions has a view angle in the front direction of the optical distance measuring apparatus.

9. The optical distance measuring apparatus according to claim 8, wherein the one of the plurality of light projection and light reception portions has an optical axis relatively far from the front direction compared with an optical axis of the another one of the plurality of light projection and light reception portions, and the view angle of the one of the plurality of light projection and light reception portions is narrower than the view angle of the another one of the plurality of light projection and light reception portions.

10. The optical distance measuring apparatus according to claim 1, wherein one of the plurality of light projection and light reception portions has a view angle in a front direction of the optical distance measuring apparatus, another one of the plurality of light projection and light reception portions has a view angle including an area farthest in the front direction among an entire detection angle range of the optical distance measuring apparatus, the one of the plurality of light projection and light reception portions has a detection distance longer than a detection distance of the another one of the plurality of light projection and light reception portions, and the one of the plurality of light projection and light reception portions has the view angle narrower than the view angle of the another one of the plurality of light projection and light reception portions.

11. The optical distance measuring apparatus according to claim 1, wherein one of the plurality of light projection and light reception portions has an optical axis relatively far from the front direction compared with an optical axis of another one of the plurality of light projection and light reception portions, and the view angle of the one of the plurality of light projection and light reception portions is narrower than a view angle of the another one of the plurality of light projection and light reception portions.

* * * * *